United States Patent
Boivin et al.

(10) Patent No.: US 8,292,351 B2
(45) Date of Patent: *Oct. 23, 2012

(54) RESILIENT STRUT FOR AERODYNAMIC SKIRT

(75) Inventors: Mathieu Boivin, Montreal (CA); Philippe Desjardins, Montréal (CA); Mathieu Desjardins, Montréal (CA)

(73) Assignee: Transtex Composite Inc., Montreal, Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/078,982

(22) Filed: Apr. 3, 2011

(65) Prior Publication Data

US 2011/0175396 A1    Jul. 21, 2011

Related U.S. Application Data

(60) Continuation of application No. 12/647,019, filed on Dec. 24, 2009, now Pat. No. 7,942,471, which is a division of application No. 12/360,038, filed on Jan. 26, 2009, now Pat. No. 7,887,120.

(60) Provisional application No. 61/024,217, filed on Jan. 29, 2008.

(51) Int. Cl.
*B62D 35/02*    (2006.01)
*B60R 9/00*    (2006.01)

(52) U.S. Cl. ..................... 296/180.4; 180/903

(58) Field of Classification Search .......... 105/1.1, 105/1.2, 1.3; 180/903; 248/628, 632; 296/180.1, 296/180.4; D12/106

See application file for complete search history.

(56) References Cited

U.S. PATENT DOCUMENTS

| 564,027 A | 7/1896 | Pratt |
| 1,127,241 A | 2/1915 | Hawksworth |
| 1,511,085 A | 10/1924 | McIntyre |
| 1,846,269 A | 2/1932 | Musselman ............ 156/130 |

(Continued)

FOREIGN PATENT DOCUMENTS

CA    2651688    7/2009

(Continued)

OTHER PUBLICATIONS

Canadian Intellectual Property Office, May 5, 2010,Related to the canadian patent application No. 2,651,688, 2 page(s).

(Continued)

*Primary Examiner* — Glenn Dayoan
*Assistant Examiner* — Paul Chenevert
(74) *Attorney, Agent, or Firm* — Mathieu Audet

(57) ABSTRACT

A resilient strut adapted to secure an aerodynamic skirt to a trailer is provided, the aerodynamic skirt comprising a skirt panel including a front portion and a rear portion adapted to be substantially longitudinally mounted to the trailer, the front portion being adapted to be mounted toward a forward portion of the trailer and the rear portion being adapted to be mounted toward a rear portion of the trailer in an aerodynamic configuration, the skirt panel being adapted to move away from the aerodynamic configuration when contacting a foreign object and to recover its aerodynamic configuration thereafter, the resilient strut adapted to sustain an elastic deformation allowing the resilient strut to bend when a load is applied to the resilient strut when the skirt panel moves away from the aerodynamic configuration and to self-recover its original shape when the load is removed. A kit of resilient struts, a method thereof and a trailer equipped with same are also provided.

57 Claims, 12 Drawing Sheets

U.S. PATENT DOCUMENTS

| | | | | |
|---|---|---|---|---|
| 2,318,863 | A | 5/1943 | Jabelmann | 105/1.2 |
| 2,546,268 | A | 3/1951 | Legris | 248/626 |
| 2,605,119 | A | 7/1952 | Earnest | 280/849 |
| 3,711,146 | A | 1/1973 | Madzsar et al. | 296/180.2 |
| 3,775,917 | A * | 12/1973 | Struben | 52/169.12 |
| 3,854,769 | A | 12/1974 | Saunders | |
| 4,119,339 | A | 10/1978 | Heimburger | 296/180.5 |
| 4,261,149 | A | 4/1981 | Gustafson | |
| 4,262,953 | A | 4/1981 | McErlane | |
| 4,386,801 | A | 6/1983 | Chapman et al. | 280/107 |
| 4,397,496 | A | 8/1983 | Drygas | |
| 4,402,537 | A | 9/1983 | Gallitzendörfer | |
| 4,418,853 | A | 12/1983 | Shaffer | |
| 4,421,354 | A | 12/1983 | Lemaster | |
| 4,486,046 | A | 12/1984 | Whitney | |
| 4,511,170 | A | 4/1985 | Sankrithi | |
| 4,560,195 | A | 12/1985 | Price | |
| 4,585,262 | A | 4/1986 | Parks | 296/180.1 |
| 4,611,847 | A | 9/1986 | Sullivan | 296/180.2 |
| 4,616,869 | A | 10/1986 | Sacco et al. | 296/180.1 |
| 4,640,541 | A | 2/1987 | FitzGerald et al. | 296/180.1 |
| 4,746,160 | A | 5/1988 | Wiesemeyer | 296/180.2 |
| 4,882,887 | A | 11/1989 | Giles | |
| 5,078,448 | A | 1/1992 | Selzer | |
| 5,094,503 | A | 3/1992 | Dare-Bryan | 296/180.1 |
| 5,280,990 | A | 1/1994 | Rinard | |
| 5,358,210 | A | 10/1994 | Simon et al. | 248/628 |
| 5,465,669 | A | 11/1995 | Andrus | |
| 5,536,062 | A | 7/1996 | Spears | 296/180.3 |
| 5,609,384 | A | 3/1997 | Loewen | |
| 5,788,321 | A | 8/1998 | McHorse et al. | |
| 6,017,013 | A | 1/2000 | Simonian | 248/632 |
| 6,644,720 | B2 | 11/2003 | Long et al. | 296/180.4 |
| 6,685,256 | B1 | 2/2004 | Shermer | |
| 6,742,616 | B2 | 6/2004 | Leban | 180/116 |
| 6,874,842 | B2 | 4/2005 | Hojna | |
| 6,932,419 | B1 | 8/2005 | McCullough | 296/180.1 |
| 6,974,178 | B2 | 12/2005 | Ortega et al. | |
| 7,040,682 | B2 * | 5/2006 | Tokumoto et al. | 296/1.08 |
| 7,073,845 | B2 | 7/2006 | Ortega et al. | |
| 7,093,889 | B2 | 8/2006 | Graham | |
| 7,147,270 | B1 | 12/2006 | Andrus et al. | 296/180.5 |
| 7,163,258 | B2 | 1/2007 | Dyer et al. | 296/191 |
| 7,168,757 | B2 * | 1/2007 | Futatsuhashi | 296/209 |
| 7,216,923 | B2 | 5/2007 | Wong et al. | 296/180.2 |
| 7,404,592 | B2 | 7/2008 | Reiman et al. | |
| 7,497,502 | B2 | 3/2009 | Wood | 296/180.4 |
| 7,578,541 | B2 | 8/2009 | Layfield et al. | 296/180.2 |
| 7,604,284 | B2 | 10/2009 | Reiman et al. | 296/180.4 |
| 7,665,795 | B2 | 2/2010 | Shishikura | |
| 7,686,385 | B2 | 3/2010 | Dolan et al. | |
| 7,740,303 | B2 | 6/2010 | Wood | |
| 7,748,772 | B2 * | 7/2010 | Boivin et al. | 296/180.4 |
| 7,762,615 | B2 | 7/2010 | Dayton | |
| 7,780,224 | B2 | 8/2010 | Roush | |
| 7,789,453 | B2 | 9/2010 | Roush | |
| 7,828,368 | B2 | 11/2010 | Ortega | |
| 7,887,120 | B2 | 2/2011 | Boivin | |
| 7,938,475 | B2 * | 5/2011 | Boivin et al. | 296/180.4 |
| 7,942,467 | B2 * | 5/2011 | Boivin et al. | 296/180.4 |
| 7,942,468 | B2 * | 5/2011 | Boivin et al. | 296/180.4 |
| 7,942,469 | B2 * | 5/2011 | Boivin et al. | 296/180.4 |
| 7,942,470 | B2 * | 5/2011 | Boivin et al. | 296/180.4 |
| 7,942,471 | B2 | 5/2011 | Boivin | |
| D649,090 | S * | 11/2011 | Boivin et al. | D12/106 |
| 8,087,715 | B2 * | 1/2012 | Andrus et al. | 296/180.1 |
| 2002/0021023 | A1 | 2/2002 | Leban | |
| 2003/0057736 | A1 | 3/2003 | Long | |
| 2003/0234555 | A1 | 12/2003 | Hojna | 296/180.1 |
| 2004/0155485 | A1 | 8/2004 | Hamnett | 296/180.1 |
| 2005/0056117 | A1 | 3/2005 | Jones | |
| 2005/0146161 | A1 | 7/2005 | Uland | |
| 2005/0161976 | A1 | 7/2005 | Ortega et al. | 296/180.4 |
| 2006/0103167 | A1 | 5/2006 | Wong | |
| 2006/0152038 | A1 | 7/2006 | Graham | |
| 2006/0273625 | A1 | 12/2006 | Andrus | |
| 2007/0120397 | A1 * | 5/2007 | Layfield et al. | 296/180.4 |
| 2007/0132278 | A1 * | 6/2007 | Lester et al. | 296/191 |
| 2007/0176466 | A1 | 8/2007 | Dolan | |
| 2007/0257512 | A1 | 11/2007 | Anderson | |
| 2008/0048468 | A1 | 2/2008 | Holubar | |
| 2008/0061597 | A1 | 3/2008 | Reiman | |
| 2008/0061598 | A1 | 3/2008 | Reiman | |
| 2008/0093887 | A1 | 4/2008 | Wood | |
| 2008/0179916 | A1 | 7/2008 | Breakfield | |
| 2008/0238139 | A1 | 10/2008 | Cardolle | 296/180.4 |
| 2008/0303309 | A1 | 12/2008 | Dayton | 296/180.1 |
| 2008/0303311 | A1 | 12/2008 | Roush | 296/180.4 |
| 2009/0146453 | A1 | 6/2009 | Ortega et al. | 296/180.4 |
| 2009/0160214 | A1 | 6/2009 | Alguera | |
| 2009/0189414 | A1 | 7/2009 | Boivin | |
| 2009/0195017 | A1 | 8/2009 | Wood | 296/180.4 |
| 2009/0212595 | A1 | 8/2009 | Heppel et al. | 296/180.4 |
| 2009/0212596 | A1 | 8/2009 | Reiman | |
| 2009/0218848 | A1 | 9/2009 | Boivin | |
| 2009/0230726 | A1 | 9/2009 | Reiman | |
| 2010/0066123 | A1 | 3/2010 | Ortega et al. | |
| 2010/0096880 | A1 | 4/2010 | Boivin et al. | |
| 2010/0096881 | A1 | 4/2010 | Boivin et al. | |
| 2010/0096882 | A1 | 4/2010 | Boivin et al. | |
| 2010/0096883 | A1 | 4/2010 | Boivin et al. | |
| 2010/0098481 | A1 | 4/2010 | Boivin et al. | |
| 2010/0117396 | A1 * | 5/2010 | Dayton | 296/180.1 |
| 2010/0187856 | A1 | 7/2010 | Boivin et al. | |
| 2010/0231000 | A1 | 9/2010 | Andrus | |
| 2010/0264691 | A1 | 10/2010 | Giromini | |
| 2011/0204677 | A1 * | 8/2011 | Wood et al. | 296/180.1 |
| 2011/0233960 | A1 * | 9/2011 | Heinz | 296/180.4 |
| 2011/0285167 | A1 * | 11/2011 | Butler | 296/180.1 |
| 2012/0032475 | A1 * | 2/2012 | Grandominico et al. | 296/180.4 |

FOREIGN PATENT DOCUMENTS

| | | |
|---|---|---|
| CA | 2668323 | 7/2009 |
| CA | 2689745 | 7/2009 |
| CA | 2689746 | 7/2009 |
| CA | 2689747 | 7/2009 |
| CA | 2689748 | 7/2009 |
| CA | 2689749 | 7/2009 |
| CA | 2689751 | 7/2009 |
| CA | 129387 | 9/2009 |
| CA | 131712 | 9/2009 |
| EP | 1 870 322 A | 12/2007 |
| GB | 1528108 | 10/1978 |
| GB | 2 238 762 A | 6/1991 |
| GB | 2 271 323 A | 4/1994 |
| GB | 2271323 | 4/1994 |
| JP | 60012378 | 1/1985 |
| JP | 60012378 A | 1/1985 |
| JP | 2002019574 A * | 1/2002 |
| WO | 2006115988 A2 | 11/2006 |
| WO | WO 2006/115988 A2 | 11/2006 |

OTHER PUBLICATIONS

Canadian Intellectual Property Office, Jul. 23, 2010,Related to the canadian patent application No. 2,651,688, 3 page(s).

Canadian Intellectual Property Office, May 19, 2011,Related to the canadian patent application No. 2,651,688, 5 page(s).

Canadian Intellectual Property Office, Jun. 7, 2010,Related to the canadian patent application No. 2,668,323, 2 page(s).

Canadian Intellectual Property Office, Apr. 26, 2011,Related to the canadian patent application No. 2,668,323, 5 page(s).

Canadian Intellectual Property Office, Jun. 4, 2010,Related to the canadian patent application No. 2,689,749, 3 page(s).

Canadian Intellectual Property Office, Apr. 26, 2011,Related to the canadian patent application No. 2,689,749, 2 page(s).

Canadian Superior Court, *Transtex Composite Inc.* v. *Tycorra Inventments Inc.* and *Ridge Corporation*, "Amended Plea and Cross-Demand of the Defendant Ridge Corporation", dated Sep. 3, 2010, 29 pages, with selected ones of the supporting Exhibits—separately listed.

Internet Website, Fleet Engineers Air Slipper Side Skirt, http://www.fleetengineers.com/fairing.html, Sep. 3, 2010, 3 pages (Exhibit DR-24).

Internet Website, Business Finance: Product Information, http://www.smartwayfinancecenter.com/productView.cfm?productID=67, Apr. 27, 2010, 2 page (Exhibit DR-9).

Internet Website, Trailerskirts Laydon Composites::, http://webcache.googleusercontent.com/search?q=cache:2yP01-v19hMJ:www.laydoncomp . . . ,Apr. 12, 2010, 3 pages (Exhibit DR-10).
Internet Website, Truck Fuel Saving, Aerodynamic Fairing, Aerodynamic Parts, Truck Industry, http://www.windyne.com/features-functions.htm, Apr. 27, 2010, 2 pages (Exhibit DR-11).
Wabash National®, "Introducing the DuraPlate AeroSkirt™", 2009, 2 pages (Exhibit DR-12).
Photograph "Choice Reefer Systems" 2 pages (Exhibit DR-13).
Photograph "Another bite out of our carbon footprint", 2 pages (Exhibit DR-14).
Protest filed in a counterpart Canadian patent application No. 2,668,323 by a third party dated Oct. 18, 2010.
Canadian Superior Court, *Transtex Composite Inc.* V. *Tycorra Inventments Inc.* and *Ridge Corporation*, "*Amended* Plea and Cross-Demand of the Defendant Ridge Corporation", dated Sep. 3, 2010, 29 pages, with selected ones of the supporting Exhibits—separately listed.
Internet Website, Business Finance: Product Information, http://www.smartwayfinancecenter.com/productView.cfm?productID=67, Apr. 27, 2010, 2 page (Exhibit DR-9).
Photograph "Choice Reefer Systems" 2 pages (Exhibit DR-13) 2009.
Photograph "Another bite out of our carbon footprint", 2 pages (Exhibit DR-14) 2009.
Canadian Superior Court, *Transtex Composite Inc.* V. *Tycorra Inventments Inc. and Ridge Corporation*, "Plea and Cross-Demand of the Defendant Ridge Corporation", dated Apr. 29, 2010, 24 pages.
Complaints for Declaratory Judgment; *Ridge Corporation* V. *Transtex Composite Inc.*, dated Sep. 19, 2011, 6 pages.
Protest filed Aug. 24, 2011, by a third party, in counterpart Canadian patent application No. 2,668,323, 9 pages.
Request for Exparte Reexamination of U.S. Patent 7,887,120, 279 pp. Verified Complaint for Patent Infringement and appended documents—*Transtex Composite Inc.* v. *Laydon Composites LTD.* —Mar. 21, 2012, 2582 pages.
Canadian Intellectual Property Office, Dec. 19, 2011, Related to Canadian Patent Application 2,651,688, 5 pages.
Canadian Intellectual Property Office, Dec. 20, 2011, Related to Canadian Patent Application 2,668,323, 3 pages.
Canadian Intellectual Property Office, May 25, 2012, Related to Canadian Patent Application 2,668,323, 3 pages.
Canadian Intellectual Property Office, Oct. 28, 2011, Related to Canadian Patent Application 2,689,746, 4 pages.
Canadian Intellectual Property Office, Oct. 28, 2011, Related to Canadian Patent Application 2,689,747, 4 pages.
Canadian Intellectual Property Office, Oct. 28, 2011, Related to Canadian Patent Application 2,689,751, 2pages.
Canadian Intellectual Property Office, Oct. 28, 2011, Related to Canadian Patent Application 2,689,748, 3 pages.
Canadian Intellectual Property Office, Nov. 7, 2011, Related to Canadian Patent Application 2,689,745, 3 pages.
Supplemental Information to Protest, by third party, Feb. 21, 2012, Related to Canadian Patent Application 2,668,323, 96 pages.
Supplemental Information to Protest, by third party, May 22, 2012, Related to Canadian Patent Application 2,668,323, 17 pages.
Request for Exparte Reexamination of U.S. Patent 7,748,772, 77 pages.
Complaints for Declaratory Judgement; Case No. 2:11CV840, Sep. 19, 2011, 7 pages.
Request for Exparte Reexamination of U.S. Patent 7,942,467, 195 pages.
Request for Exparte Reexamination of U.S. Patent 7,942,468, 243 pages.
Request for Exparte Reexamination of U.S. Patent 7,942,469, 221 pages.
Request for Exparte Reexamination of U.S. Patent 7,938,475, 40 pages.
Request for Exparte Reexamination of U.S. Patent 7,942,470, 242 pages.
Request for Exparte Reexamination of U.S. Patent 7,942,471, 230 pages.
Mechanically fastened composite side-door impact beams for passenger cars designed for shear-out failure modes ; Tae Seong Lim; Dai Gil Lee Mechanical Design Laboratory with Advanced Materials, Department of Mechanical Enginering, Korea Advanced Institute of Science and Technology. Me3221, 373-1 Gusong-dong, Yusong-gu, Daejon-shi 305-701, Korea, Republic of Journal: Composite structures, 2002, 56 (2) 211-221 ISSN: 0263-8223 CODEN: COMSE2 Availability: INIST-20190 ; 354000100741520100 No. of Refs. 19 ref. Document Type: P (Serial) ; A (Analytic) Country of Publication: United Kingdom Language: English.
An experimental study of drag reduction devices for a trailer underbody and base; Jun. 4, 2004; J. M. Ortega, K. Salari; UCRL-CONF-204489; 34th AIAA Fluid Dynamic Conference and Exhibit, Portland, OR, United States, Jun. 28, 2004 through Jul. 1, 2004.
TrailerBody Builder; Internet site HTTP://trailer-bodybuilders.com/mag/trucks_trailerskirt_success/; Trailer-Skirt Success; Jan. 1, 2006, 3 pages.
Canadian Intellectual Property Office, Jul. 4, 2012, Related to Canadian Patent Application 2,689,748, 3 pages.

\* cited by examiner

RESILIENT STRUT FOR AERODYNAMIC SKIRT

CROSS-REFERENCE

The present application relates to and is a continuation application of U.S. patent application Ser. No. 12/647,019, filed Dec. 24, 2009, entitled AERODYNAMIC TRAILER SHAPE, that is a divisional application of U.S. patent application Ser. No. 12/360,038, filed Jan. 26, 2009, entitled AERODYNAMIC TRAILER SKIRTS, which claims priority from U.S. Provisional Patent application No. 61/024,217, filed Jan. 29, 2008, entitled AERODYNAMIC TRAILER SKIRT. All these documents are incorporated herein by reference.

FIELD OF THE INVENTION

This invention relates to aerodynamic trailer skirts adapted to be mounted on trailers to improve the aerodynamic efficiency of the trailer.

BACKGROUND OF THE INVENTION

Road tractors are used to pull road trailers on roads to transport cargo. Aerodynamic apparatuses are installed on the road tractor and/or on the road trailer in order to reduce the aerodynamic air drag and improve fuel efficiency.

Trailer skirts made of rigid materials are installed on both sides of a road trailer to help manage the flow of air around and underneath the trailer. Brackets, also made of rigid material, are affixed to the trailer to secure the skirts positioned thereto. These skirts are secured to the bottom portion of the trailer, or on the sides of the trailer's floor, to ensure proper positioning when the vehicle is moving.

People who are familiar with the trucking industry know that trailers are subject to hazardous road conditions. The skirts, because of their position under the trailer's floor and their proximity with the road, are significantly vulnerable and might easily enter in contact with surrounding obstacles. The brackets holding the skirts, when put under significant stress, plastically bend and/or break to effect the skirts' position in respect to the road trailer thus reducing the efficiency of the skirts. Moreover, the skirt itself might bend and/or break if they contact a foreign object. This also increases the operation cost and the maintenance time that is required.

The shape of the skirts, and their respective positions on the road trailer, have a significant effect on the aerodynamics efficiency of the road trailer.

Therefore, there exists a need in the art for an improved aerodynamic skirt assembly over the existing art. There is a need in the art for such a resilient skirt assembly that can be easily installed and economically manufactured.

SUMMARY OF THE INVENTION

It is one aspect of the present invention to alleviate one or more of the drawbacks of the background art by addressing one or more of the existing needs in the art.

Accordingly, embodiments of this invention provides an improved trailer skirt over the prior art.

An embodiment of the invention provides a skirt assembly adapted to be installed on a road trailer to reduce the aerodynamic drag produced by the movement of the road trailer when pulled by a road tractor. The skirt assembly comprising a skirt panel sized and designed to channel air along the trailer. The skirt assembly, once installed on the road trailer, being substantially vertically disposed under the road trailer between the road trailer wheels and the trailer supports (and could even be extended in front of the trailer supports) with a curved shape defined from the front of the skirt panel to a distance of about between 1.5 meter to 3.5 meters.

One embodiment of the invention provides a resilient skirt assembly that is adapted to bend when it contacts a foreign object and recovers its original position and shape thereafter.

One other embodiment of the invention provides a resilient skirt assembly that can be easily installed and economically manufactured.

Another embodiment of the invention provides a skirt panel adapted to be installed on a road trailer with a rear edge disposed next to the forwardmost road trailer rear wheel to keep a gap therebetween to a minimum. The skirt panel being adapted to forwardly extend next to the road trailer support.

Another embodiment of the invention provides a skirt assembly made of composite materials offering a significant range of elastic deformation.

Another embodiment of the invention provides a resilient strut adapted to secure a skirt panel to a road trailer, the strut being made of a resilient material adapted to sustain significant deformation and adapted to resiliently regain its original position.

Another aspect of one or more embodiments of the invention provides strut supports made of non-metallic material.

One embodiment of the invention provides a trailer skirt that is sized and designed to allow a temporary deflection of, inter alia, a bottom portion of the skirt panel.

A further embodiment of the invention provides a fastening system for easily securing the skirt panel to the trailer; the fastening system uses a limited number of parts to reduce the assembly time and the weight added to the trailer.

A further embodiment of the invention provides a skirt assembly comprising a plurality of support angles adapted to secure the skirt panel to the road trailer.

According to a further embodiment, support angles made of composite material is provided.

An embodiment of the present invention provides a resilient strut shaped in one piece.

According to another embodiment of the present invention is provided a resilient strut made of composite materials.

Another embodiment of the present invention provides a resilient strut having a constant section.

A further embodiment provides a resilient strut adapted to be connected to the skirt panel at an angle.

One additional embodiment of the present invention provides an opening in the skirt panel adapted to allow access to a fuel tank located underneath the road trailer, the opening being adapted to be optionally provided with a door.

Another additional embodiment of the present invention provides a skirt panel composed of a plurality of skirt panel modules, at least one panel module being adapted to be removed or pivoted about a hinged mechanism to allow access under the road trailer.

Another embodiment of the present invention provides a substantially progressive curvature on the forward portion of the skirt panel.

One other embodiment of the invention provides a method of installing a skirt assembly on a road trailer comprising installing fastening a portion of a skirt panel substantially on the edge of a road trailer floor and securing a forwardmost portion of the skirt panel at a predetermined position on the trailer to define the shape of the skirt panel.

Another embodiment of the invention provides a radius on the skirt panel adapted to mate the shape of the road trailer wheel to reduce the air gap therebetween.

One other embodiment of the invention provides a skirt panel extension adapted to selectively reduce the gap between the road trailer wheels and the skirt panel when the road trailer wheels, disposed on a moveable trailer buggy, are longitudinally moved about the road trailer to change the load distribution of the road trailer.

Another embodiment of the present invention provides an aerodynamic skirt adapted to be mounted to a trailer, the aerodynamic skirt comprising a skirt panel defining a front portion and a rear portion, the front portion being adapted to be proximally mounted toward a center of the trailer, the rear portion being adapted to be substantially longitudinally mounted to the trailer.

One other embodiment of the present invention provides a method of installing a skirt assembly on a trailer, the method comprising securing upper supports to the trailer, securing a skirt panel to the upper supports, and securing struts between the trailer and the skirt panel.

An embodiment of the present invention provides a skirt assembly kit comprising a skirt panel adapted to be disposed on a trailer to route air about the road trailer, a plurality of upper supports adapted to secure the skirt panel to the road trailer and a plurality of struts adapted to secure the skirt panel to the road trailer.

One additional embodiment of the invention provides an aerodynamic skirt adapted to be substantially longitudinally mounted on a trailer, the resilient aerodynamic skirt comprising a skirt panel defining a forward portion and a rear portion, the forward portion being adapted to be mounted toward a forward portion of the trailer and the rear portion being adapted to be mounted toward a rear portion of the trailer, the forward portion having a front height and the rear portion having a rear height, the forward height being shorter than the rear height.

Another embodiment of the present invention provides a method of mounting an aerodynamic skirt on a trailer, the method comprising providing a skirt panel defining a forward portion and a rear portion the forward portion having a front height and the rear portion having a rear height, the forward height being shorter than the rear height, positioning the forward portion toward a forward portion of the trailer and the rear portion toward a rear portion of the trailer, and securing the skirt panel to the trailer.

A further embodiment of the present invention provides a kit comprising a skirt panel defining a forward portion and a rear portion, the forward portion being adapted to be mounted toward a forward portion of the trailer and the rear portion being adapted to be mounted toward a rear portion of the trailer, the forward portion having a front height and the rear portion having a rear height, the forward height being smaller than the rear height; and at least one strut adapted to secure the skirt panel to the trailer.

Other embodiments and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Additional and/or alternative advantages and salient features of the invention will become apparent from the following detailed description, which, taken in conjunction with the annexed drawings, disclose preferred embodiments of the invention.

BRIEF DESCRIPTION OF THE DRAWINGS

Referring now to the drawings which form a part of this original disclosure.

DETAILED DESCRIPTION OF PREFERRED EMBODIMENTS

A preferred embodiment of the present invention is described below with reference to the drawings.

Figure 1:
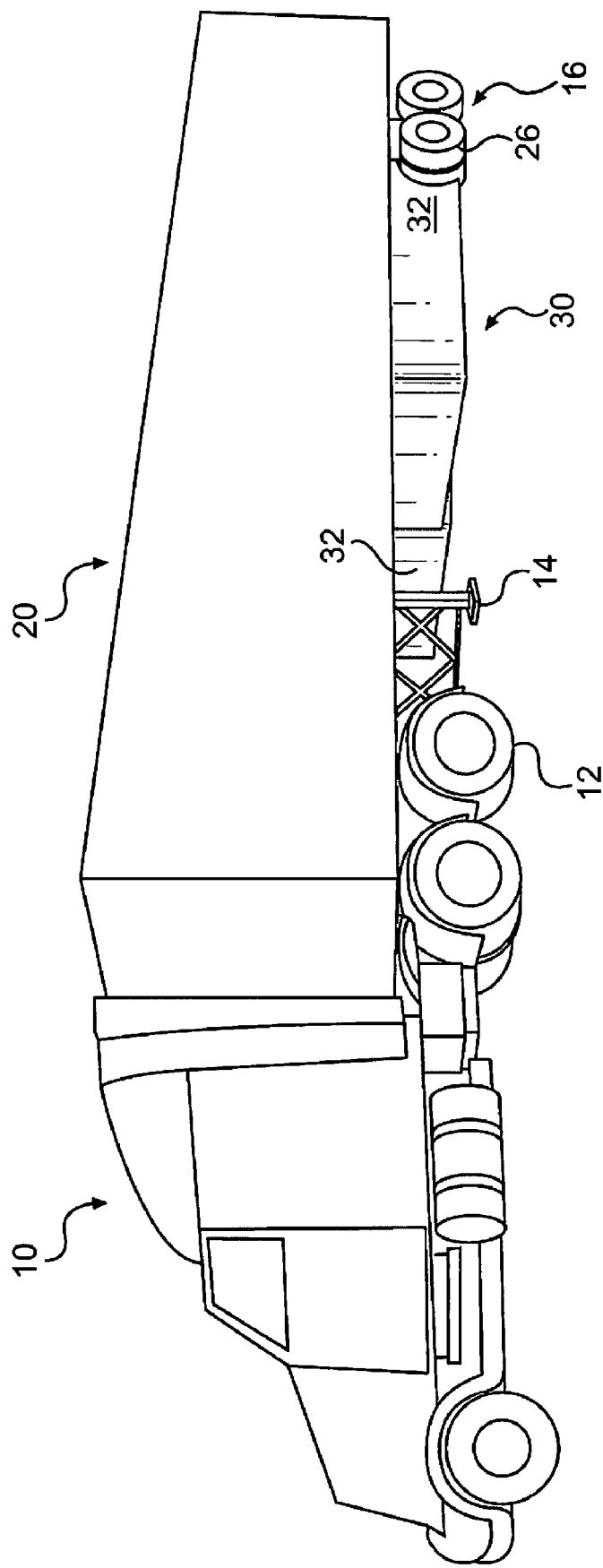
FIG. 1 is a perspective view of a road tractor and a road trailer with a skirt assembly secured thereto.
Figures 2, 3:
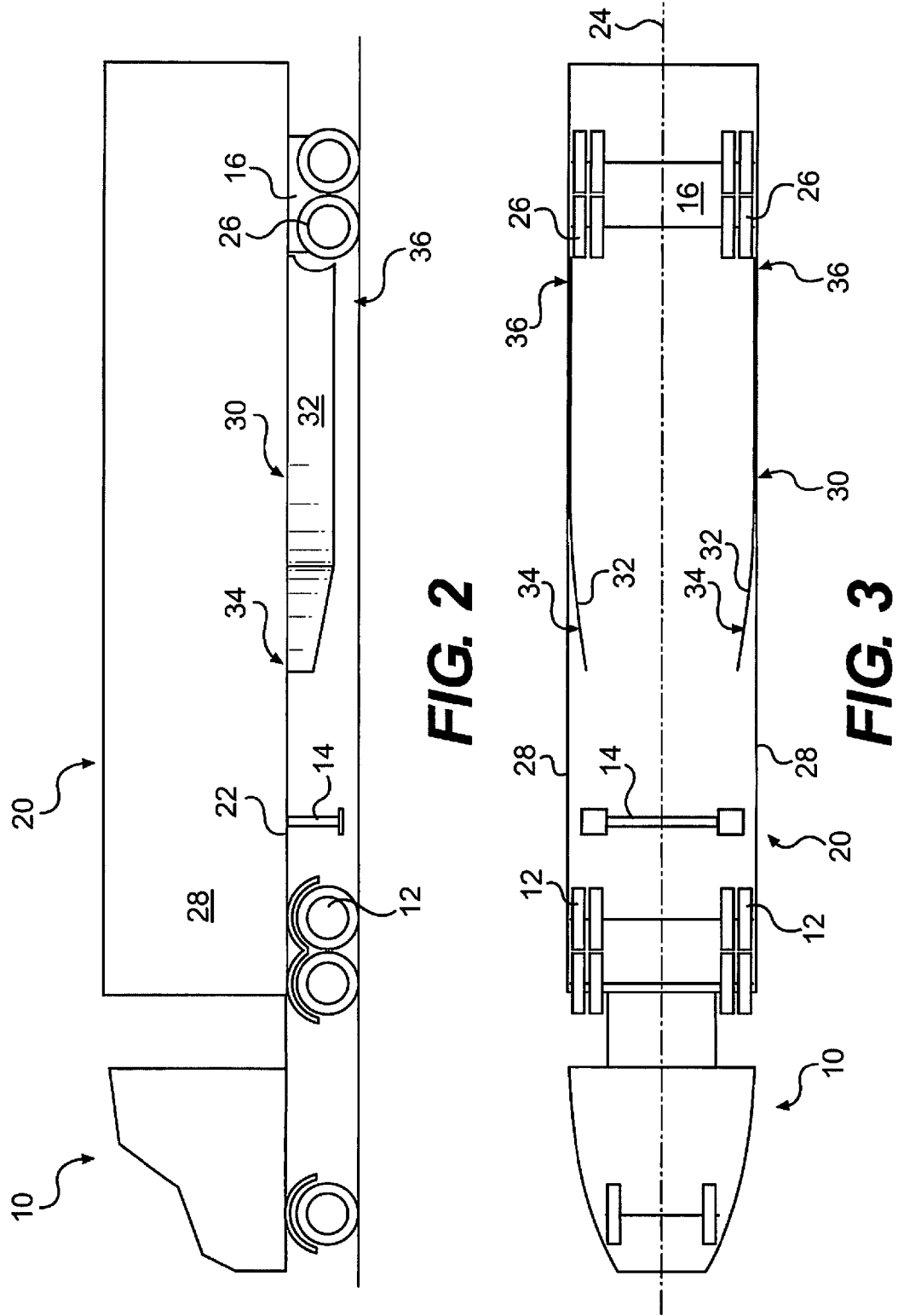
FIG. 2 is a left elevational view of the road tractor of FIG. 1.
FIG. 3 is a bottom plan view of the road tractor of FIG. 1.

FIGS. 1, 2 and 3 illustrate a road tractor 10 with a road trailer 20 attached thereto equipped with a pair of skirt assemblies 30, installed on each side of the road trailer 20, adapted to deflect and direct the airflow around the road trailer 20. Each skirt assembly 30 includes a skirt panel 32, adapted to be disposed on the side of the road trailer 20, and a plurality of securing members adapted to secure the skirt panel 32 to the road trailer 20. The securing members are not illustrated on FIGS. 1, 2 and 3 and will be discussed in more details later in this specification. Once installed on the road trailer 20, the skirt assembly 30 helps channel the flow of air around the road trailer 20 to reduce the air drag of the vehicle when the road trailer 20 moves on the road, pulled by the road tractor 10.

The skirt assembly 30 of the present embodiment is mostly located under the road trailer 20, between the wheels 12 of the road tractor 10 and the wheels 26 of the road trailer 20. The skirt panels 32 can alternatively extend forward up to the trailer supports 14 of the road trailer, and be secured thereto, thus preventing complex skirt panel 32 arrangements through the trailer supports 14. The skirt panels 32 are substantially vertically positioned on each side of the road trailer 20 with a clearance with the ground by illustratively about 15-25 centimeters (about 6 to 10 inches). The air management around the trailer 20 provided by the skirt assembly 30 reduces the air drag created by the road trailer 20 by directing the flow of air around the road trailer 20. The flow of air would otherwise turbulently move around and below the road trailer 20 to create substantial air drag. The airflow management around the road trailer 20 provided by the skirt assembly 30 helps maintain laminar airflow around the road trailer 20 that helps diminish fuel consumption of the road tractor 10. The skirt assembly 30 also improves the safety of the vehicle by providing a barrier that can significantly prevent foreign objects to get under the road trailer 20.

The skirt panel 32 can also be used to display advertising thereon. Each skirt panel 32 provides additional display area in addition to the road trailer's wall 22.

As illustrated, the skirt panel 32 is shaped with an optional progressive height from the forwardmost portion 34. The skirt panels 32 can alternatively also be installed at an angle, in respect to the vertical, on the road trailer 20 to change the airflow pattern around the road trailer 20 and more precisely adjust the aerodynamics to a specific vehicle shape.

It can be appreciated from FIG. 3 that each skirt panel 32 is installed directly on the side of the road trailer 20 and, when seen from above, have a front portion 34 that progressively proximally leans toward the center 24 of the road trailer 20. The recessed front portion 34 of the skirt panel 32 improves the collection of the turbulent airflow generated by the road tractor 10 thus improving the aerodynamic efficiency of the skirt assembly 30. Additional explanation about the shape of the skirt panel 32 will be provided in further details below.

Figure 4:
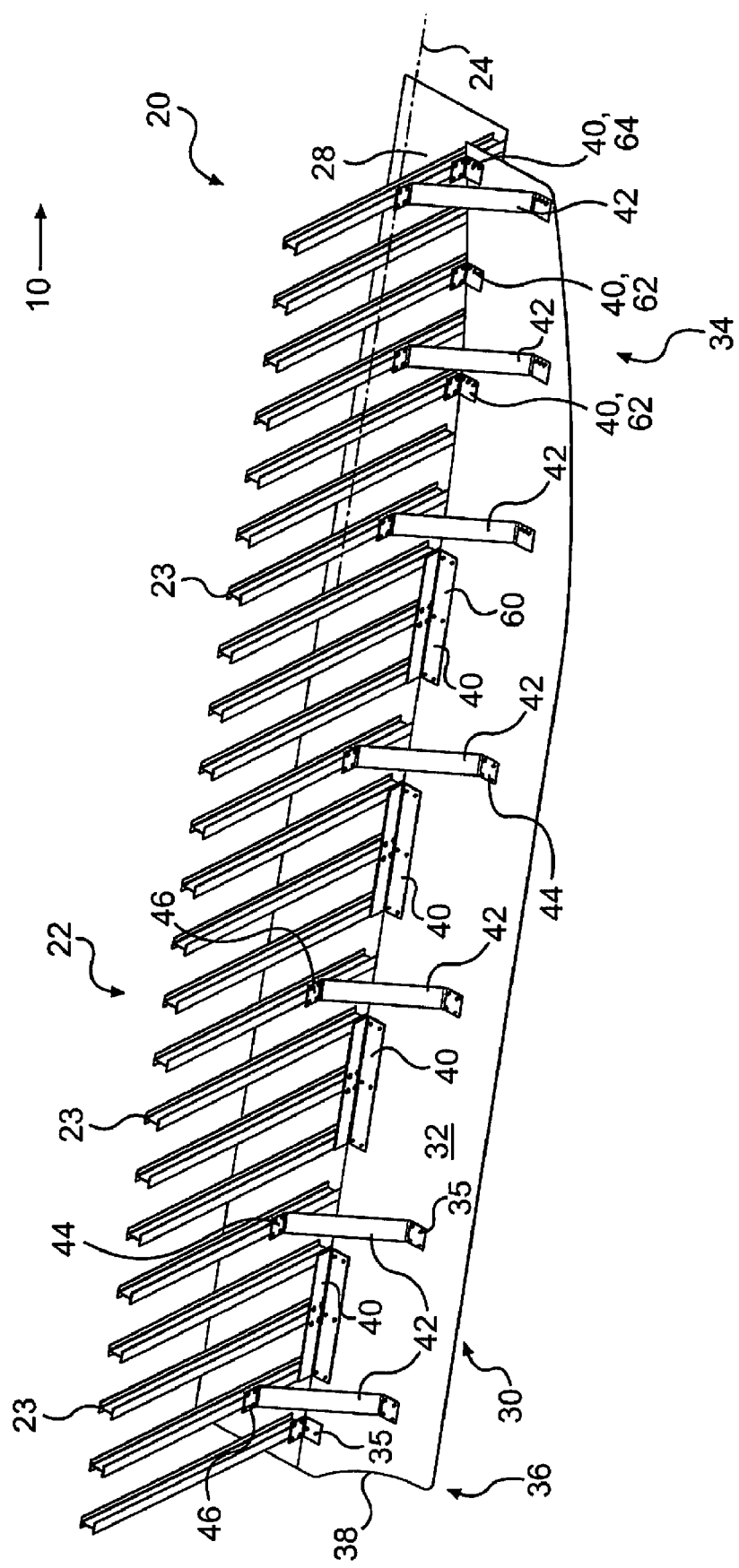
FIG. 4 is a left-front perspective view of a portion of a floor section of the road trailer of FIG. 1.

FIG. 4 is a perspective image of the skirt assembly 30 installed on the left side of a road trailer 20 from which is only illustrated a series of frame members 23 forming a portion of the road trailer floor frame 22. A series of angle supports 40 are secured to the trailer to secure the juxtaposed skirt panel 32 thereto. The angle supports 40 could be omitted altogether and the skirt panel could alternatively be attached directly to the road trailer 20 without deviating from the scope of the present application. The rear portion 36 of the skirt panel 32 is preferably positioned on the edge of the road trailer's wall 28. It is also encompassed by the present invention that the skirt panel 32 be installed a little in recess about the side of the road trailer 20 to avoid winches, lights, toolbox or ladders located on the side/edge of the road trailer 20. In contrast, it can be appreciated that the front portion 34 of the skirt panel 32 is progressively positioned and secured toward the center 24 of the road trailer 20. The skirt panel 32 is secured adjacent to the frame 22 with a series of angle supports 40 secured to both the frame members 23 and the skirt panel 32. Lower, the skirt panel 32 is secured to the road trailer 20 with a series of intervening resilient struts 42 also secured to both the frame members 23 and the skirt panel 32. Additional details about the angle supports 40 and the resilient struts 42 are provided later in reference with FIG. 7 through FIG. 11.

Still referring to FIG. 4, it can be appreciated that the upper series of holes 35 disposed on a top portion of the skirt panel 32 is used to fasten the skirt panel 32 to respective angle supports 40 that, themselves, are secured to frame members 23 of the road trailer 20. A number of connection points between the skirt panel 32 and the road trailer 20 are used to ensure the skirt panel 32 is well secured to the road trailer 20 and will not vibrate or deflect (some deflection can be acceptable under certain conditions) during operation. The series of holes 35 disposed on a lower portion of the skirt panel 32 are adapted to fasten to an end of each resilient strut 42. Similarly, the other end of the resilient strut 42 is connected to the frame members 23 of the road trailer 20 via a fastener mechanism that will be discussed below in details.

A curved portion 38 is defined on the rear portion 36 of the skirt panel 32 and preferably corresponds to the exterior shape of the adjacent wheel 26 of the road trailer 20. In so doing, it is possible to install the skirt panel 32 close to the wheel 26 without risking any contact therebetween. The skirt panel 32 should be installed as close as possible to the road trailer wheels 26 to maximize its efficiency. It is preferable to leave a distance between the wheel 26 of the road trailer 20 and the skirt panel 32 to avoid any risk of interference therebetween.

The wheels 26 of a road trailer 20 are commonly adapted to be longitudinally adjustable to distribute the mass of the road trailer 20 in a desired fashion. The adjustment of the position of the axels of a road trailer 20 is desirable, for instance, when a heavy load is carried or during thaw and freeze periods. In this respect, and to avoid reinstalling the skirt panel 32 in various positions on the road trailer 20, it might be desirable to install the skirt panel 32 in respect with the forwardmost possible position of the axels of the road trailer 20. That would prevent to remove and reposition the skirt panel 32 when the trolley's 16 position is modified.

The road trailer wheels 26 are mounted on a road trailer buggy 16 adapted to move the wheels 26 along a portion of the road trailer's length to distribute the weight of the road trailer 20 in a desired fashion. The skirt assembly 30 is preferably permanently secured to the road trailer 20 taking in consideration the forwardmost position of the trailer buggy 16. The gap between the skirt panel 32 and the road trailer's wheels 26 is however increased when the trailer buggy 16 is move toward the rear of the road trailer 20 thus likely reducing the aerodynamic efficiency of the skirt assembly 30. The present invention provides a skirt panel extension module 33 adapted to reduce the gap between the skirt panel 32 and the road trailer's wheels 26 to prevent any aerodynamic efficiency reduction. The skirt panel extension modules 33 are secured to the road trailer in a similar fashion. The skirt panel extension module 33 can be provided in various lengths to fill gaps of various sizes. They can also be provided as skirt panel extension modules 33 kit. An alternate embodiment provides a sliding skirt panel extension 33 that is permanently secured to the road trailer 20 and extendable to the desired length when the trailer buggy 16 is moved.

Figure 6:
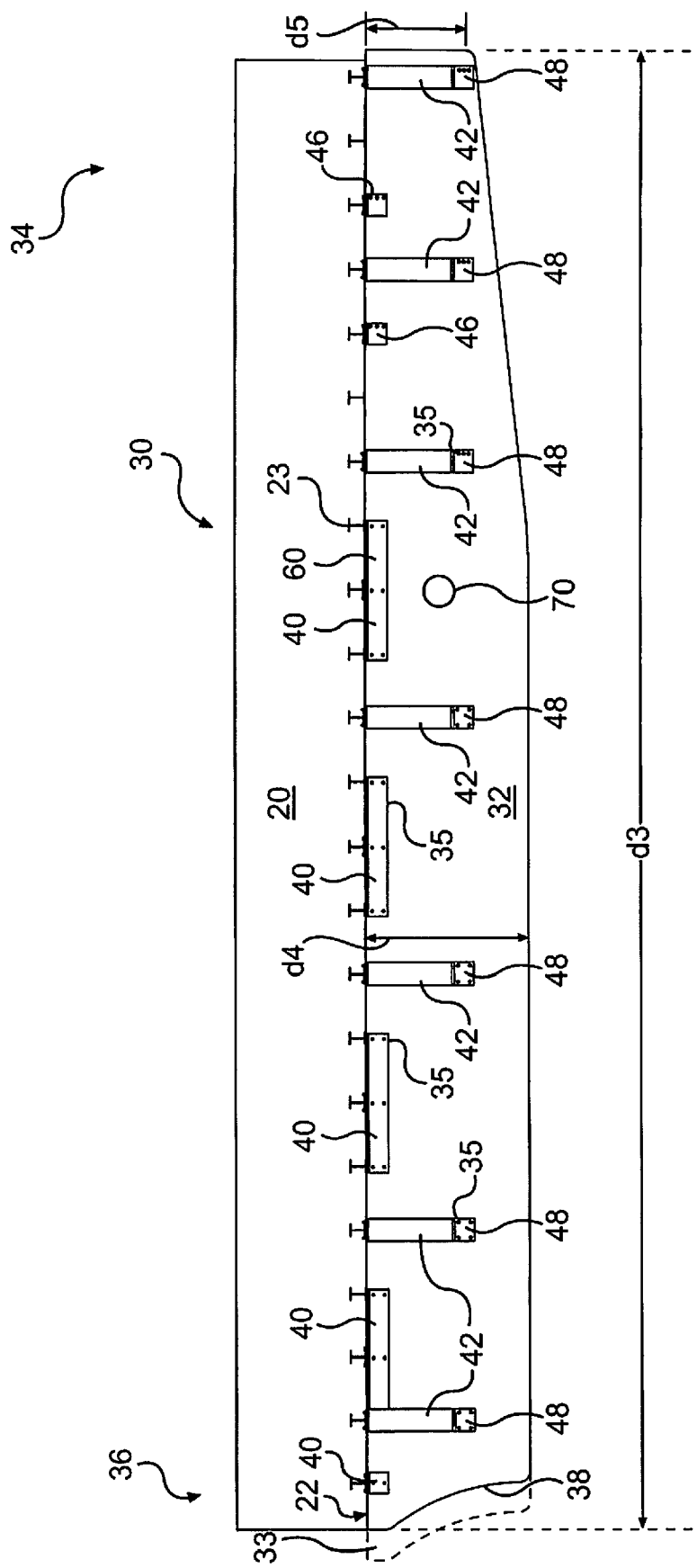
FIG. 6 is a right elevational section view of a portion of the road trailer and the skirt assembly of FIG. 1.

A skirt panel extension 33, illustrated on FIG. 6, can alternatively be added between the skirt panel 32 and the wheels 26 when the axles of the road trailer 20 are located in a rearward position leaving an increased distance therebetween to improve the aerodynamic efficiency of the skirt assembly 30. A reasonable distance between the skirt panel 32 and the wheels 26 could be between about 15 centimeters and about 30 centimeters although a shorter distance, or even a superposition of the skirt panel 32 (or skirt panel module(s) 33) over the wheel 26, can be achieved.

Figure 5:
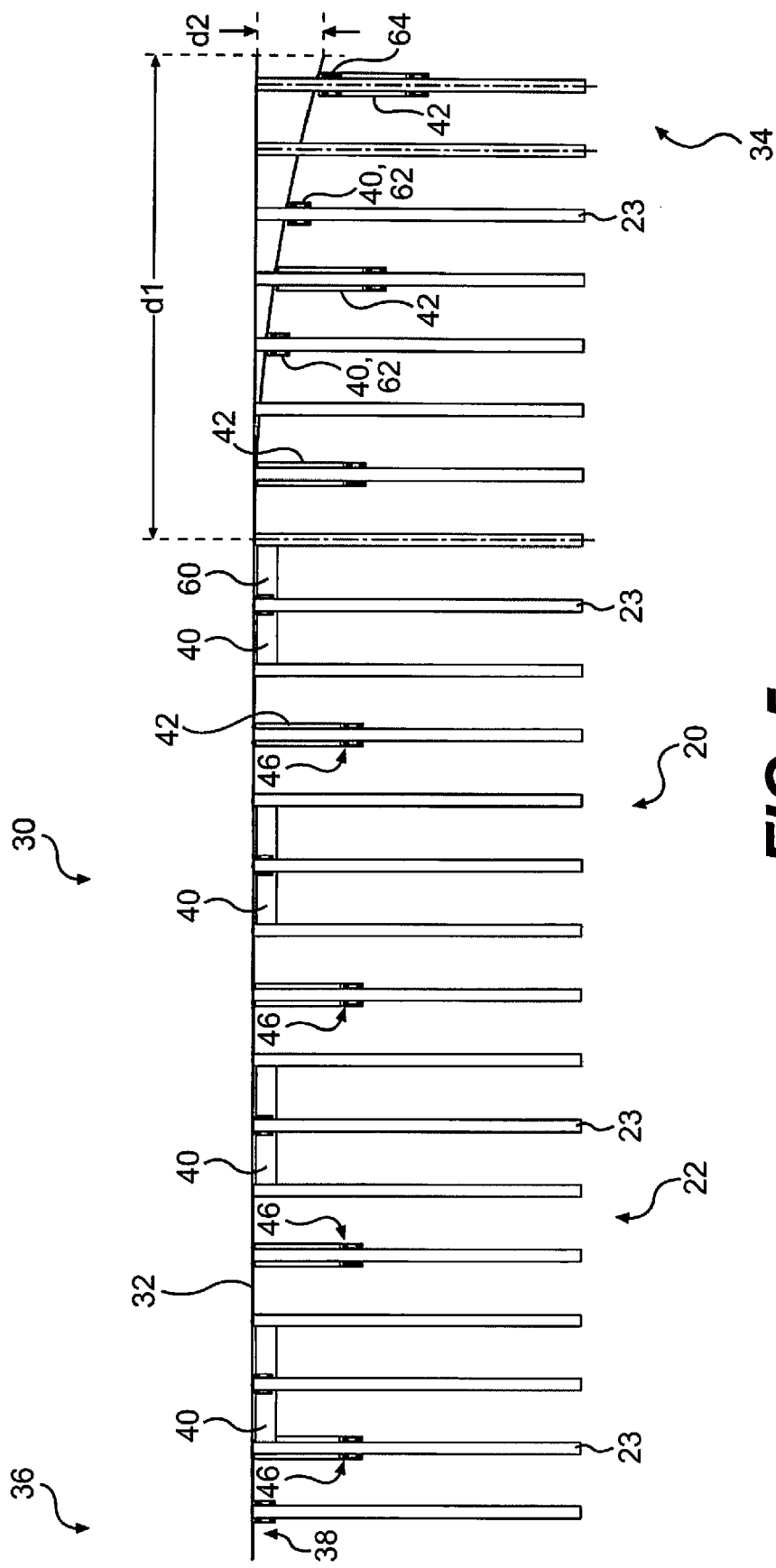
FIG. 5 is a top plan view of a portion of the floor section of FIG. 4.

FIG. 5 is a top elevational view of the road trailer frame 22. As mentioned above, it can be appreciated from FIG. 5 that the skirt panel 32 is disposed inwardly on the forward portion of the road trailer 20 and is progressively located on the edge of the road trailer's wall 28 toward the rear end of the road trailer 20. A departure angle support 60 and a cooperating forward angle support 64 are secured to the road trailer to correctly locate the skirt panel 32 on the road trailer 20. The departure angle support 60 and the forward angle support 64 are installed on the trailer 20 prior to install the skirt panel 32. The rear portion 36 of the skirt panel 32 is secured to the road trailer 20 up to the departure angle support 60 and then the skirt panel 32 is bent to reach the forward angle support 64 and secured thereto. That bent locates the skirt panel 32 to the road trailer 20 and defines the shape of the skirt panel 32 with the desired progressive proximal bent. The remaining angle supports 62 and resilient struts 42 are installed thereafter to further secure the assembly.

The rear portion 36 of the skirt panel 32 is intended to be secured to the road trailer to leave only a minimum gap with the road trailer wheels 26 to improve the aerodynamic efficiency of the skirt assembly 30. The skirt panel 32 extends to the front of the road trailer 20 and defines a curve portion on its front portion 34. A long skirt 32 appears to be more efficient than a shorter skirt panel 32 and should therefore extend as far as possible to the front of the road trailer 20. However, for reasons of complexity, the front portion 34 of the skirt panel 32 is likely to stop at the trailer supports 14. It is nonetheless encompassed by the present invention that the skirt panel 32 alternatively extends in front of the trailer supports 14. The lowermost portion of the front portion 34 of the skirt panel 32 is provided with a radius thereof as it is best seen in FIG. 6.

In one embodiment, the skirt panel 32 is made of composite material. Recommended multilayer composite material, polypropylene component, glass component or reinforced thermoplastic manufactured by Transtex Composites Inc. is used in the present embodiment. The composite material forming the skirt panel 32 of the illustrative example is shaped in a planar material adapted to allow skirt panel 32 to bend when the skirt panel 32 is pushed toward the center of the road trailer 20 (proximally) when, for instance, contacting an obstacle or having a force applied thereon. The resilient struts 42 can bend inwardly or inwardly. The skirt panel 32 bends, allowing a significant displacement of the bottom portion of the skirt panel 32, and is adapted to retrieve its original position when the force is removed from the skirt panel 32. As further illustrated in FIG. 6, the skirt panel 32 is provided with a series of holes 35 used to connect the skirt panel 32 to the road trailer 20. The series of holes 35 disposed on the upper portion of the skirt panel 32 is used to connect the skirt panel 32 to the frame 22 of the trailer 20 whereas, in a similar fashion, the series of holes 35 disposed on the bottom portion of the skirt panel 32 is used to connect the skirt panel 32 to the skirt connecting portion 48 of the resilient strut 42. The resilient strut 42 is connected to the frame member 23 of the trailer via the trailer connecting portion 46 of the resilient strut 42. The skirt connecting portion 48 and the trailer connecting portion 46 are provided with respective series of holes 35 to receive fasteners therein. The holes 35 can be factory pre-drilled or can be drilled during installation to ensure desired customization. Rivets or bolts are placed in the holes 35 to secure the skirt panel 32 to the trailer frame 22 or the support assembly. Other appropriate fastening mechanism variations well known in the art are encompassed by the present disclosure and can be used without departing from the scope of the invention.

A left side elevational view schematically illustrating, on FIG. 6, the overall size of the skirt panel 32. Length $d_3$ of the skirt panel 32 is about between 5 meters and 9 meters, preferably about between 6 meters and 8 meters and most preferably about between 6.5 meters and 7.5 meters. The height $d_4$ of the skirt panel 32 is about between 0.5 meter and 1 meter, preferably about between 0.6 meter and 0.9 meter and most preferably about between 0.7 meter and 0.8 meter. And the forwardmost height $d_5$ of the skirt panel 32 is about between 0.3 meter and 0.7 meter, preferably about between 0.4 meter and 0.6 meter and most preferably about between 0.45 meter and 0.5 meter. More precisely, distance $d_4$ is preferably about 0.76 meter and distance $d_5$ is preferably about 0.48 meter in a preferred embodiment.

Alternate embodiments providing a skirt assembly sized and designed to fit road trailers of different lengths can be inferred from the dimensions discussed above. For instance, a skirt assembly can be designed to fit a 14.6 meters (48 feet) road trailer 20 or any other road trailer 20 sizes and lengths.

In one embodiment, the skirt panel 32 is made of composite material. Recommended multilayer composite material, or fiber reinforced polypropylene, a combination of a polypropylene component and woven component reinforced thermoplastic manufactured by Transtex Composites Inc. is used in the present embodiment. The composite material forming the skirt panel 32 of the illustrative example is shaped in a planar material adapted to allow skirt panel 32 to bend when the skirt panel 32 is pushed toward the center of the road trailer 20 (proximally) when, for instance, contacting an obstacle or having a force applied thereon. The skirt panel 32 bends, allowing a significant displacement of the bottom portion of the skirt panel 32, and is adapted to retrieve its original position when the force is removed from the skirt panel 32. As further illustrated in FIG. 6, the skirt panel 32 is provided with a series of holes 35 used to connect the skirt panel 32 to the road trailer 20. The series of holes 35 disposed on the upper portion of the skirt panel 32 is used to connect the skirt panel 32 to the frame 22 of the trailer 20 whereas, in a similar fashion, the series of holes 35 disposed on the bottom portion of the skirt panel 32 is used to connect the skirt panel 32 to the skirt connecting portion 48 of the resilient strut 42. The resilient strut 42 is connected to the frame member 23 of the trailer via the trailer connecting portion 46 of the resilient strut 42. The skirt connecting portion 48 and the trailer connecting portion 46 are provided with respective series of holes 35 to receive fasteners therein. The holes 35 can be factory pre-drilled or can be drilled during installation to ensure desired customization. Rivets or bolts are placed in the holes 35 to secure the skirt panel 32 to the trailer frame 22 or the support assembly. Other appropriate fastening mechanism variations well known in the art are encompassed by the present disclosure and can be used without departing from the scope of the invention.

An opening 70 is defined in the skirt panel 32 to allow access to an optional fuel tank disposed on the road trailer 20 to fuel an onboard generator or freezer. Such a fuel tank is commonly disposed under the floor 22 of the road trailer 20 and is most likely hidden by the skirt assembly 30. The opening is sized, designed and located on the skirt panel 32 to allow access to the fuel tank. A door (not illustrated) can optionally be added to close the opening 70.

Figure 7:
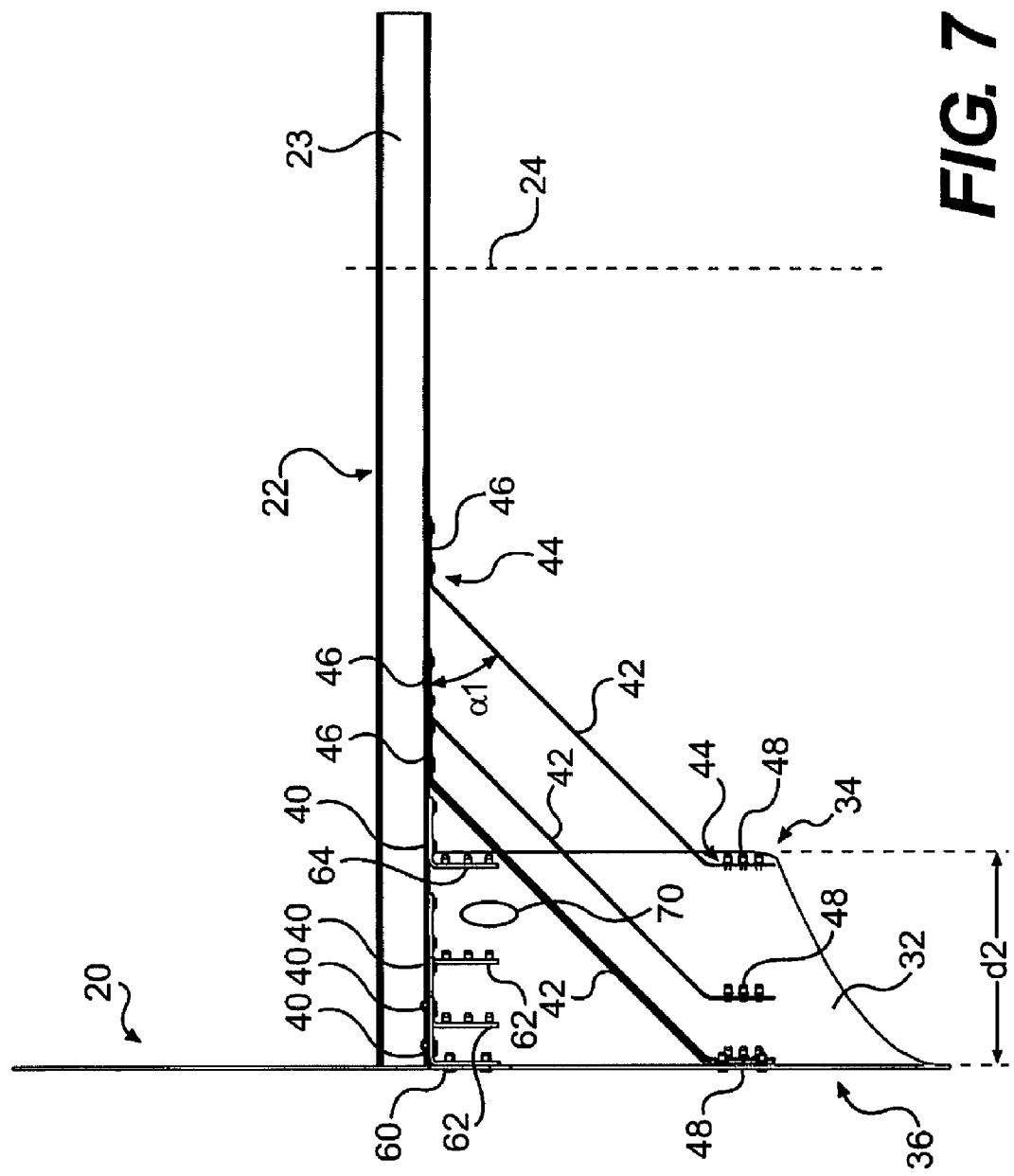
FIG. 7 is a rear elevational section view of a portion of the road trailer and the skirt assembly of FIG. 1.

Turning now to FIG. 7 where is illustrated a plurality of resilient struts 42 and angles support 40 secured between the frame 22 and the skirt panel 32. The rear elevational view shows that the front portion 34 of the skirt panel 32 is proximally recessed from the left lateral side of the trailer 20 by, illustratively, about 30 centimeters. It can also be appreciated that the skirt panel 32 is held to the road trailer frame 22 via the series of angled support 40 on its upper portion. The trailer connecting portion 46 of the resilient strut 42 is connected to the frame member 23 at an angle $\alpha_1$, which is an angle of about 45° in the present illustrative embodiment and could be different without departing from the present description.

In another unillustrated embodiment, the section of the resilient strut 42 has a shape adapted to increase its stiffness. A "U" shaped resilient strut 42 can be manufactured. Alternatively, an embossed portion on a planar shaped resilient strut 42 can also be manufactured. Preferably the selected shape should prevent dirt and road debris to keep stuck on the resilient strut 42. The shape can also be uneven along the length of the resilient strut 42 to provide an uneven flex to the resilient strut 42.

The resilient struts 42 of the present embodiment is about 4 millimeters thick and can reach a radius of 20 centimeters without going into plastic deformation or breaking. Generally, the thinner the resilient strut 42 is, the shorter will be its maximum radius of curvature. A lateral proximal displacement of about 60 centimeters of the bottom portion of the skirt panel 32 is possible. The lower portion of the skirt panel 32 can even reach, under certain circumstances, a position parallel with the trailer 20 floor. The skirt assembly 30 and the skirt panel 32 will recover their original positions when the force causing the bending is removed. Further, the bending of the resilient struts 42 provides energy absorption in case of impact from another vehicle for example. It can be noted that a distal displacement of the skirt panel 32 is possible. A distal displacement of the skirt panel 32 will occur when a properly directed force is applied to the skirt panel 32 to bend the skirt panel 32.

Figure 8:
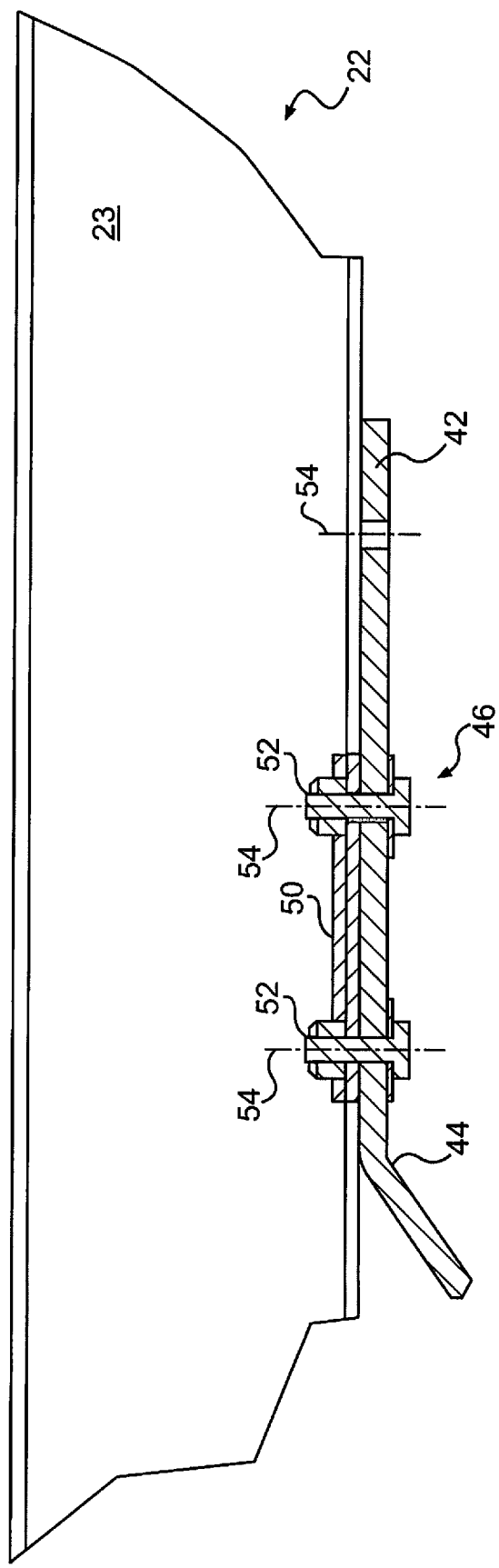
FIG. 8 is a rear elevational view of a portion of the securing mechanism of the skirt to the road trailer's floor.
Figure 9:
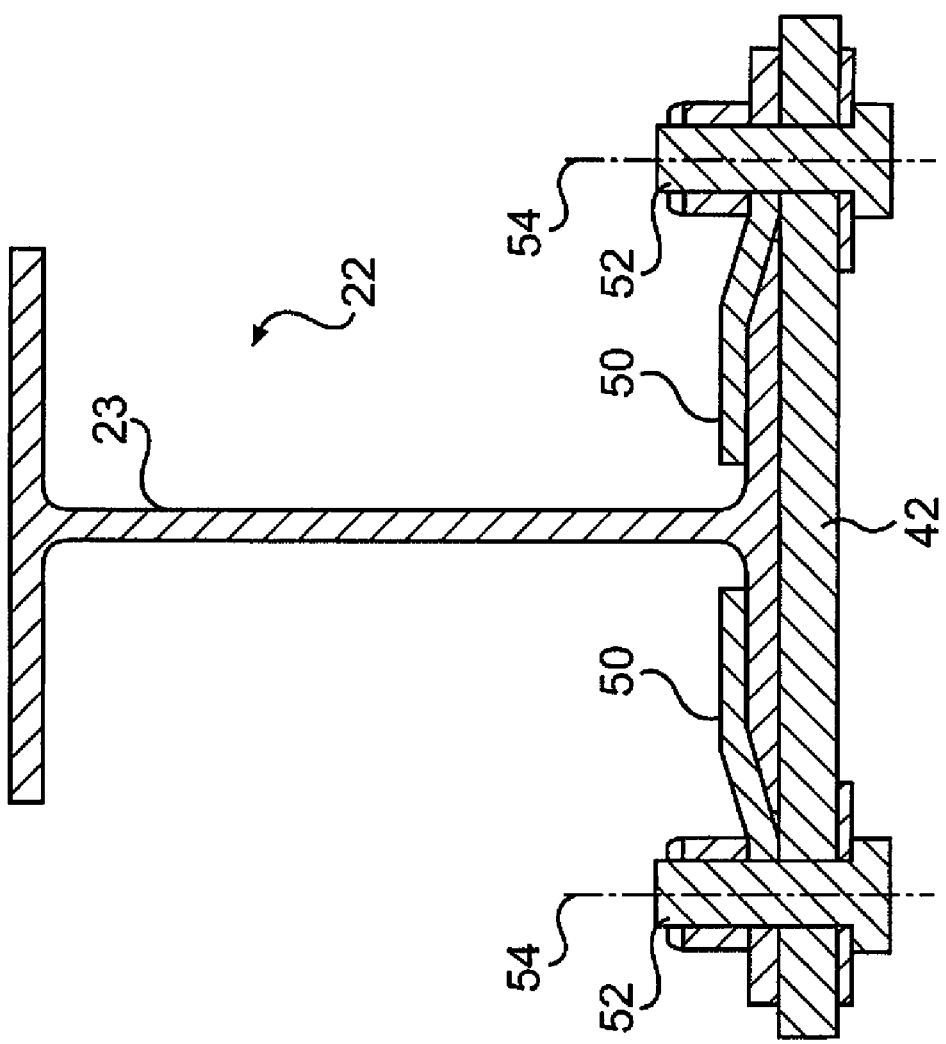
FIG. 9 is a section view of a portion of the road trailer's floor with the securing mechanism attached thereto.

FIGS. 8 and 9 depict with more details the connection mechanism between the resilient struts 42 and the trailer frame members 23. One of the resilient strut 42 ends is juxtaposed on the lower surface of the road trailer frame 22. A set of holes, identified with holes axes 54, are used to fasten two clamps 50, one on each side of the frame member 23 with fasteners 52, to secure the resilient strut 42 to the road trailer frame 22. The clamps 50 are illustratively made of a shaped stainless steel plate material to prevent corrosion.

Figure 10:
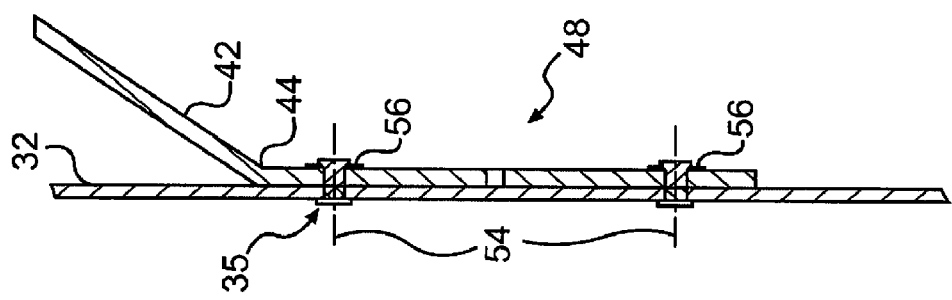
FIG. 10 is a rear elevational section view of a portion of the skirt's securing mechanism.

FIG. 10 illustrates the connection between the resilient strut 42 and the skirt panel 32. The end of the resilient strut 42 is positioned to the surface of the skirt panel 32 and secured thereto. Any types of fasteners 56 can be used to fasten both parts together. Rivets are preferably used although a bolt could also fit into the holes 54 performed in the skirt panel 32 and the resilient strut 42, and illustrated with hole axes 54 to secure the assembly. Glue or resin could alternatively be applied between the resilient strut 42 and the skirt panel 32 to secure the resilient strut 42 and the skirt panel 32 together and is also encompassed by the present invention.

Figure 11:
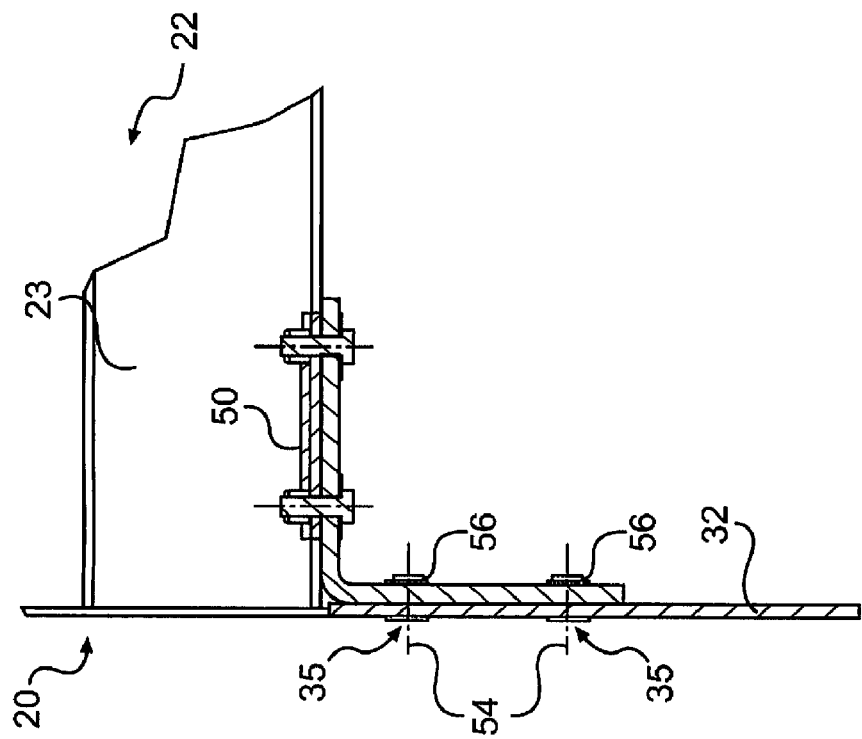
FIG. 11 is a rear elevational section view of a portion of the skirt's securing mechanism.

FIG. 11 shows the assembly between the upper portion of the skirt panel 32 and one of the angled supports 40. The angle support 40 is disposed next to the edge of the road trailer 20 to position the exterior surface of the skirt panel 32 significantly co-planar with the lateral wall of the road trailer 20. Again, any types of fasteners can be used to fasten both parts together. Rivets are preferably used but a bolt could also fit into the holes 54 in the skirt panel 32 and the angled support 40 to secure the assembly. Here again, glue or resin could alternatively be applied between the angle support 40 and the skirt panel 32 to permanently secure the angle support 40 and the skirt panel 32 together.

Figure 12:
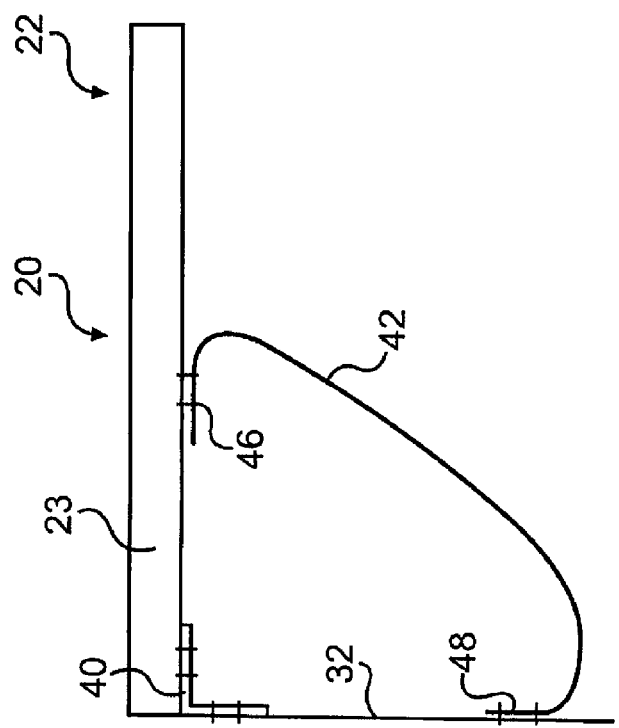
FIG. 12 is a rear elevational section view of an alternate embodiment of a portion of the skirt' securing assembly.
Figure 13:
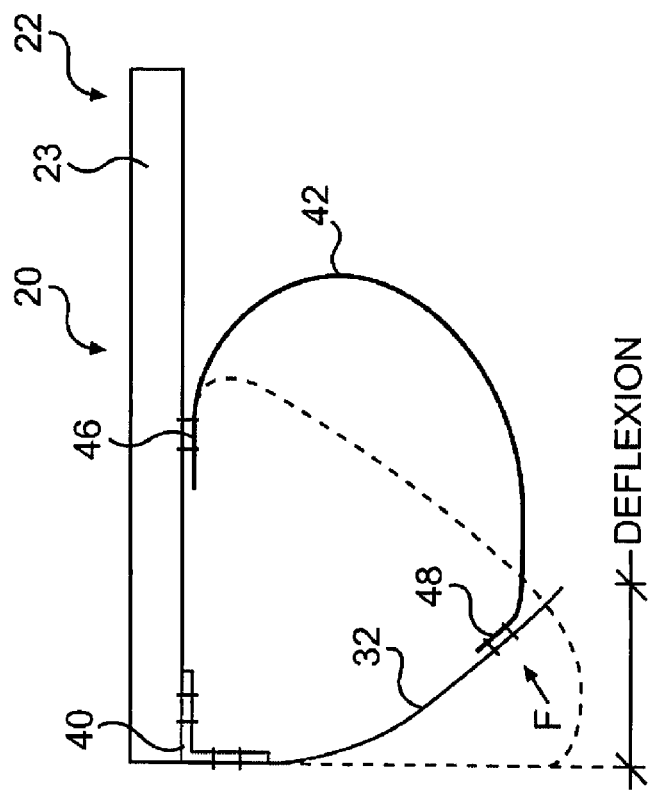
FIG. 13 is a rear elevational section view of an alternate embodiment of a portion of the skirt' securing assembly of FIG. 12 when deflected.

FIG. 12 and FIG. 13 illustrate an alternate embodiment where the resilient strut 42 is fixed to the trailer frame 22 and the skirt panel 32 differently. Instead of installing the resilient strut 42 with both ends slightly angled to mate with the skirt panel 32, both ends of the resilient strut 42 are further angled to contact the skirt panel 32 from the opposite side. This alternate layout assembly reduces the stress on the resilient strut 42, when the skirt panel 32 is deflected, for instance, under a force F, by expending the radius of curvature of the resilient strut 42 throughout the resilient strut 42 ergo significantly reducing local stress points in the resilient strut 42.

In another unillustrated embodiment, the section of the resilient strut 42 has a shape adapted to increase its stiffness. A "C" shaped resilient strut 42 can be manufactured. Alternatively, an embossed portion on a planar shaped resilient strut 42 can also be manufactured. Preferably the selected shape should prevent dirt and road debris to keep stuck on the resilient strut 42. The shape can also be uneven along the length of the resilient strut 42 to provide an uneven flex to the resilient strut 42.

As would be appreciated by those skilled in the art, in view of the present specification, the nature of the material used to build the skirt panel 32 and the resilient strut 42 can vary. These materials are also contemplated to fall within the scope of the invention if they lead to the flexibility and resilience required to build a resilient skirt assembly 30.

Figure 14:
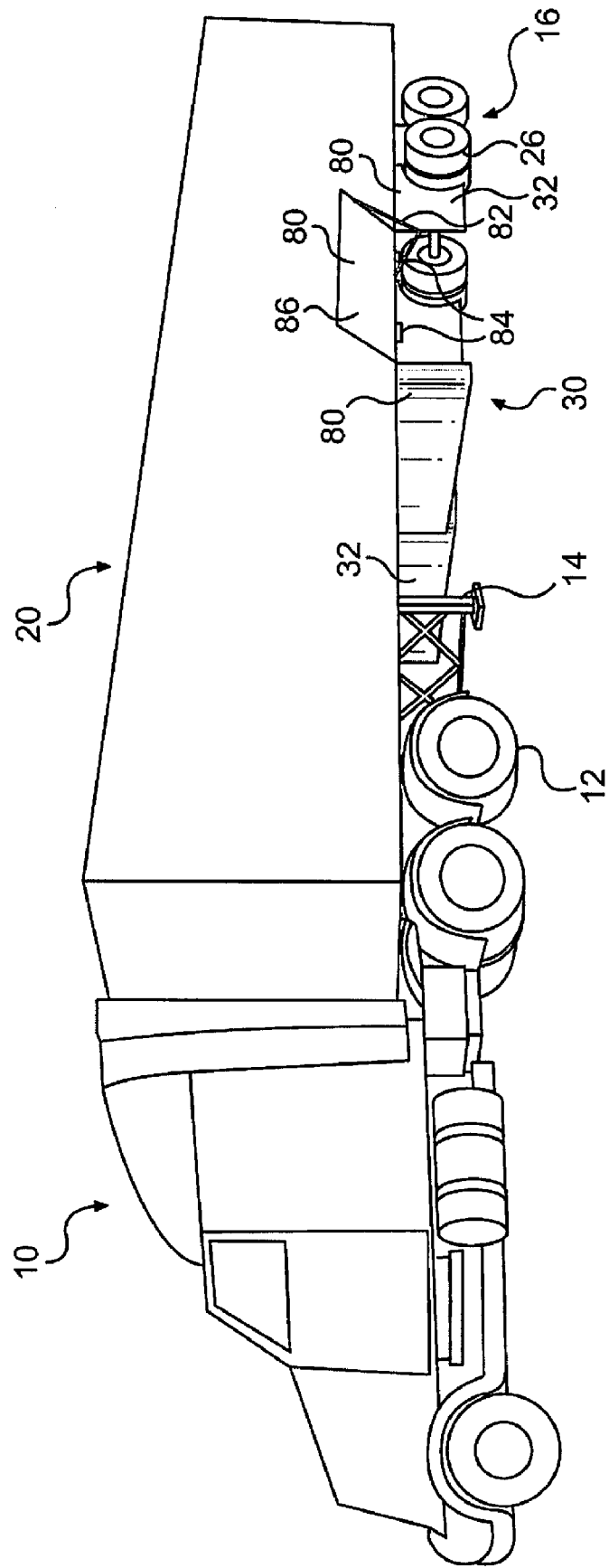
FIG. 14 is a perspective view of a road tractor and a road trailer with a skirt assembly secured thereto and a skirt panel module in the opened position.
Figure 15:
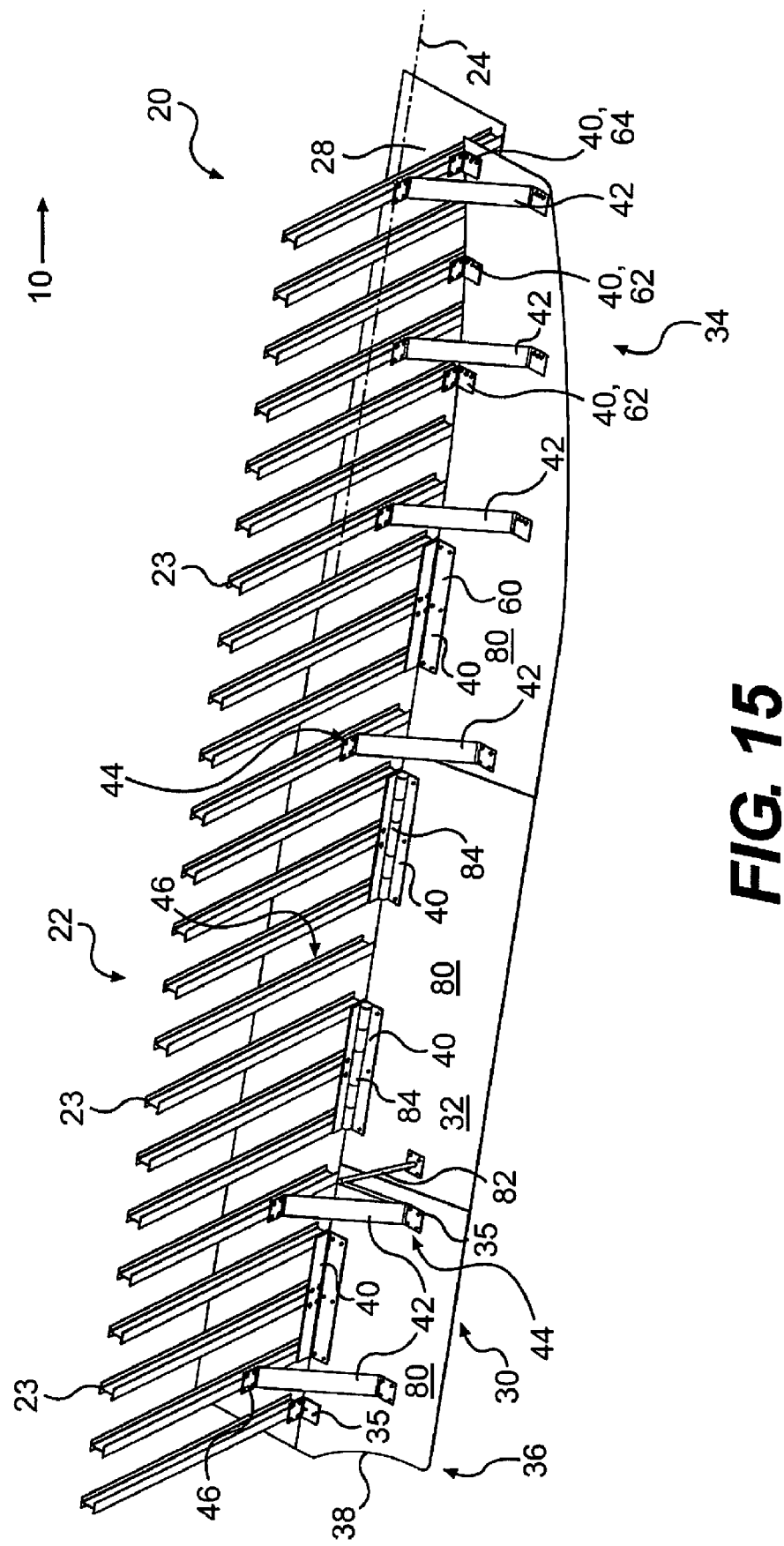
FIG. 15 is a left-front perspective view of a portion of a floor section of the road trailer of FIG. 14.

Turning now to FIG. 14 and FIG. 15, illustrating the road tractor 10 and the road trailer 20. In this embodiment the skirt panel 32 is constructed with a plurality of skirt panel modules 80. A pivotable skirt panel module 86 is adapted to be pivoted about hinges 84 to give access under the road trailer 20. A support member 82 is also provided to maintain the pivoted skirt panel module 86 in its opened position. The support member 82 being composed of a suspension means and a damper means.

While the invention has been described in connection with what is presently considered to be the most practical and preferred embodiments, it is to be understood that the invention is not to be limited to the disclosed embodiments and elements, but, to the contrary, is intended to cover various modifications, combinations of features, equivalent arrangements, and equivalent elements included within the spirit and scope of the appended claims. Furthermore, the dimensions of features of various components that may appear on the drawings are not meant to be limiting, and the size of the components therein can vary from the size that may be portrayed in the figures herein. Thus, it is intended that the present invention covers the modifications and variations of the invention, provided they come within the scope of the appended claims and their equivalents.

What is claimed is:

1. An aerodynamic skirt assembly adapted to be mounted to an underside of a trailer and reduce air drag by the trailer, the aerodynamic skirt assembly comprising:
   a skirt panel including a front portion and a rear portion, said skirt panel being adapted to be mounted to the underside of the trailer along the length of a trailer;
   a plurality of resilient struts, including
      a first end adapted to be mounted to the trailer; and
      a second end adapted to be secured to the skirt panel;
      the skirt panel and the plurality of resilient struts having an original position before being elastically deformed;
   the skirt panel being characterized in that the skirt panel can sustain substantial elastic deformation when impacted by a foreign object and to return substantially to the original position when the skirt panel is no longer being impacted by the foreign object;
   the resilient struts being characterized in that the resilient struts can sustain substantial elastic deformation when the skirt panel is impacted by a foreign object and to return substantially to the original position when the skirt panel is no longer being impacted by the foreign object.

2. The aerodynamic skirt assembly of claim 1, wherein the skirt panel comprises composite material.

3. The aerodynamic skirt assembly of claim 1, wherein the skirt panel comprises fiber reinforced polypropylene.

4. The aerodynamic skirt assembly of claim 1, wherein the skirt panel comprises a polypropylene component and a woven component.

5. The aerodynamic skirt assembly of claim 1, wherein the skirt panel is adapted to form a curved portion between the front portion and the rear portion when mounted to an underside of the trailer.

6. The aerodynamic skirt assembly of claim 1 further comprising a plurality of clamps to secure the skirt panel to an underside of the trailer.

7. The aerodynamic skirt assembly of claim 1 further comprising a plurality of clamps to secure the resilient struts to the trailer.

8. The aerodynamic skirt assembly of claim 1, wherein the skirt panel is sufficiently resilient such that it can bend and reach a radius of about 20 centimeters without going into plastic deformation or breaking.

9. The aerodynamic skirt assembly of claim 1, wherein the skirt panel and the resilient struts are sufficiently resilient such that a lower portion of the skirt panel can be deflected to reach a position that is significantly parallel with the underside of the trailer when an external force is applied thereon and to return substantially to the skirt panel original position when the external force is removed.

10. The aerodynamic skirt assembly of claim 1, wherein there are two skirt panels, one skirt panel on each side of the length of a trailer.

11. The aerodynamic skirt assembly of claim 10, wherein the two skirt panels on each side of the length of the trailer are non-parallel.

12. A resilient strut adapted to secure an aerodynamic skirt to a trailer, the aerodynamic skirt comprising: a skirt panel including a front portion and a rear portion adapted to be substantially longitudinally mounted to the trailer, the front portion being adapted to be mounted toward a forward portion of the trailer and the rear portion being adapted to be mounted toward a rear portion of the trailer in an aerodynamic configuration, the skirt panel being adapted to move away from the aerodynamic configuration when contacting a foreign object and to recover the aerodynamic configuration thereafter, the resilient strut being adapted to sustain an elastic deformation allowing an intermediate portion to bend when a load is applied to the resilient strut when the skirt panel moves away from the aerodynamic configuration and to self-recover the original shape when the load is removed.

13. The resilient strut of claim 12, wherein the resilient strut includes composite material.

14. The resilient strut of claim 12, wherein the load has a predetermined bending load limit, wherein the resilient strut is adapted to sustain a portion of the bending load limit applied thereon without bending; and wherein the resilient strut buckles when the bending load limit is applied thereon.

15. The resilient strut of claim 12, wherein the resilient strut has a substantially constant rectangular section defining opposed flat sides.

16. The resilient strut of claim 15, wherein the substantially rectangular section has a thickness of between 2 millimeters and 6 millimeters.

17. The resilient strut of claim 12, wherein the resilient strut includes an intermediate portion, a trailer connecting portion at a first end thereof, and a skirt connecting portion at a second end thereof and wherein at least one of the portions is adapted to be resilient.

18. The resilient strut of claim 17, wherein the trailer connecting portion is adapted to be secured to the trailer via a connection mechanism, the trailer connecting portion, when secured to the connection mechanism, being substantially rigidly secured hence preventing bending thereof.

19. The resilient strut of claim 17, wherein the trailer connecting portion, the skirt connecting portion and the intermediate portion are made of a continuous member.

20. A kit of resilient aerodynamic skirt and resilient struts adapted to secure the aerodynamic skirt to a trailer, the kit comprising:
a skirt panel including a front portion and a rear portion adapted to be substantially longitudinally mounted to the trailer, the front portion being adapted to be mounted toward a forward portion of the trailer and the rear portion being adapted to be mounted toward a rear portion of the trailer in an aerodynamic configuration, the skirt panel being adapted to move away from the aerodynamic configuration when contacting a foreign object and to recover, the aerodynamic configuration thereafter,
at least one resilient strut adapted to sustain an elastic deformation allowing the resilient strut to bend when a load is applied to the resilient strut when the skirt panel moves away from the aerodynamic configuration and to self-recover the original shape when the load is removed.

21. The kit of resilient struts of claim 20, further comprising at least one angle support adapted to further secure the aerodynamic skirt to the trailer.

22. The kit of resilient struts of claim 20, further comprising a second skirt panel adapted to be secured to the trailer with resilient struts.

23. The kit of resilient struts of claim 20, wherein at least a portion of the resilient strut includes composite material.

24. The kit of resilient struts of claim 20, further comprising a connection mechanism adapted to secure the resilient strut to the trailer.

25. The kit of resilient struts of claim 20, wherein the load has a predetermined bending load limit, wherein the resilient strut is adapted to sustain a portion of the bending load limit applied thereon without bending; and wherein the resilient strut buckles when the bending load limit is applied thereon.

26. A method of installing a resilient strut on a trailer to resiliently secure an aerodynamic skirt to the trailer, the method comprising:
providing a skirt panel including a front portion and a rear portion adapted to be substantially longitudinally mounted to the trailer, the front portion being adapted to be mounted toward a forward portion of the trailer and the rear portion being adapted to be mounted toward a rear portion of the trailer in an aerodynamic configuration, the skirt panel being adapted to move away from the aerodynamic configuration when contacting a foreign object and to recover the aerodynamic configuration thereafter,
providing at least one resilient strut adapted to sustain an elastic deformation thereof allowing the resilient strut to bend when the load is applied to the resilient strut when the skirt panel moves away from the aerodynamic configuration and to automatically recover the original shape when the load is removed; and
securing the at least one resilient strut to the trailer and to the skirt panel to secure the skirt panel in the aerodynamic configuration.

27. The method of installing a resilient strut of claim 26, further comprising securing the skirt panel to the trailer with an angle support.

28. A trailer comprising a resilient strut and an aerodynamic skirt adapted to be substantially longitudinally mounted to the trailer, the aerodynamic skirt comprising:

a skirt panel defining a front portion and a rear portion, the front portion being adapted to be mounted toward a forward portion of the trailer and the rear portion being adapted to be mounted toward a rear portion of the trailer in an aerodynamic configuration, the skirt panel being adapted to move away from the aerodynamic configuration when contacting a foreign object and to recover the aerodynamic configuration thereafter, the resilient strut being adapted to sustain an elastic deformation allowing bending thereof when a load is applied to the resilient strut when the skirt panel moves away from the aerodynamic configuration and to self-recover the original shape when the load is removed.

29. The trailer of claim 28, wherein resilient strut includes composite material.

30. The trailer of claim 28, wherein the resilient strut is made of a continuous member.

31. A resilient aerodynamic skirt assembly adapted to be mounted on a trailer, said skirt assembly comprising:

first and second resilient skirts for reducing aerodynamic drag, one for mounting proximate each longitudinal side of the trailer, wherein each said resilient skirt is elastically deformable, such that each said skirt is configured to sustain temporary deformation from an original position as a result of encountering an object without breaking, and thereafter recover the original position when unloaded, wherein each said skirt includes a rearward portion, a forward portion and a transition between the rearward portion and the forward portion, the rearward portions of the respective skirts configured to be generally parallel to one another when attached to the trailer and the forward portions of the respective skirts being configured to converge towards one another when attached to the trailer, wherein at least part of each said forward portion that is forward of the transition is configured to be curved inwardly over a distance spanning a plurality of I-beams of the trailer;

a plurality of non-metallic resilient supports for each said resilient skirt, wherein each said resilient support is attachable to the respective resilient skirt, wherein each said resilient support comprises a lower portion connected to the respective skirt and an upper portion positionable and configured to be aligned with an I-beam of the trailer, said lower portion being substantially in a vertical plane when unloaded, said upper portion comprising an upper surface extending in a substantially horizontal plane, wherein each said resilient support is configured to bend from an original position when part of the respective skirt is deflected inwardly when encountering an object, and thereafter regain the original position when unloaded;

fasteners to connect the lower portions of the respective resilient supports to the respective skirt; and fasteners to connect the skirt assembly to I-beams of the trailer.

32. The resilient aerodynamic skirt assembly according to claim 31, wherein each said rearward portion has a first height, and a front portion of each said forward portion has a tapered section with a second height that is less than the first height.

33. The resilient aerodynamic skirt assembly according to claim 31, wherein each said forward portion includes an upper edge that is configured to be substantially flush with the trailer along substantially the entire length of the forward portion, and a clearance between ground and a lower edge of the forward portion increases in a direction oriented towards, and is greatest at, a forwardmost portion of the forward portion.

34. The resilient aerodynamic skirt assembly according to claim 31, wherein the rearward portion of each said skirt is positionable on the trailer taking into account a forwardmost adjustable position of wheel axles of the trailer.

35. The resilient aerodynamic skirt assembly according to claim 31, wherein each of the skirts is dimensioned to extend forward of wheels of the trailer and in front of trailer supports of the trailer.

36. The resilient aerodynamic skirt assembly according to claim 31, wherein at least one of the resilient supports and the corresponding skirt are configured to flex at the same time in a substantially common orientation when under load.

37. The resilient aerodynamic skirt assembly according to claim 31, wherein the transition comprises a departure point where the skirt begins to curve along at least part of the forward portion of the skirt, and wherein the skirt is configured to curve from the departure point toward a forwardmost part of the skirt over a distance that spans at least eight I-beams of the trailer.

38. The resilient aerodynamic skirt assembly according to claim 31, wherein a portion of each skirt configured to curve inwardly spans a distance of between 1.5 and 3.0 m.

39. The resilient aerodynamic skirt assembly according to claim 31,
wherein an overall length of each skirt from a front end to a rear end is 6.5-7.5 m,
wherein a height of each skirt along a central portion thereof is about 0.6-0.9 m, and
wherein a height of each skirt proximate a forwardmost end of the skirt is about 0.3-0.7 m.

40. The resilient aerodynamic skirt assembly according to claim 31, wherein a rear end of each skirt, to be oriented towards a rear wheel of the trailer, includes a concavely curved portion.

41. The resilient aerodynamic skirt assembly according to claim 31, wherein each skirt is made of a composite material extending in one piece from a front end to a rear end of the skirt, the composite material including a glass component and a polypropylene component.

42. The resilient aerodynamic skirt assembly according to claim 31, wherein an upper portion of each said resilient skirt is connectable to an I-beam of the trailer.

43. The resilient aerodynamic skirt assembly according to claim 42, wherein the upper portion includes composite material.

44. The resilient aerodynamic skirt assembly according to claim 31, further comprising at least one clamp to connect said upper portion of at least one of said resilient supports to an I-beam of the trailer, wherein bolts as fasteners extend through holes in the upper portion of said resilient support and the clamps.

45. The resilient aerodynamic skirt assembly according to claim 44, wherein said holes, in cross section, are spaced a distance that is dimensioned to be greater than a width of an I-beam of the trailer.

46. The resilient aerodynamic skirt assembly according to claim 31, wherein the rearward portion of at least one of the skirts is substantially flush with the proximate longitudinal side of the trailer, and at least part of the forward portion of the skirt, forward of the transition, is progressively spaced inward from the proximate longitudinal side of the trailer.

47. The resilient aerodynamic skirt assembly according to claim 46, wherein the rearward portion of each said skirt is generally planar.

48. A resilient aerodynamic skirt assembly adapted to be mounted on a trailer, said skirt assembly comprising:
- at least one resilient skirt comprised of composite material, for mounting proximate a longitudinal side of the trailer, said resilient skirt being elastically deformable from an original position, such that said skirt is adapted to sustain temporary deformation as a result of encountering an object, and thereafter recover the original position and shape when unloaded; and
- a plurality of resilient supports to provide lateral support for said resilient skirt, each said resilient support comprising a first portion directly connected to the respective skirt and a second portion to be located proximate an underside of the trailer, wherein each said resilient support flexes from an original position when an adjacent part of the skirt is deflected when encountering an object, and thereafter regains the original position and shape when unloaded.

49. The resilient aerodynamic skirt assembly according to claim 48, wherein said first portion of each said resilient support is configured to contact the respective skirt, said first portion being substantially in a vertical plane when unloaded.

50. The resilient aerodynamic skirt assembly according to claim 48, wherein said skirt includes a rearward portion and a forward portion, the rearward portion being generally planar when attached to the trailer and the forward portion configured to converge towards a centerline of the trailer when attached to the trailer.

51. The resilient aerodynamic skirt assembly according to claim 48, wherein each said resilient support is flexible outwards when under load, such that the resilient support and the skirt flex in a substantially common orientation when under load.

52. The resilient aerodynamic skirt assembly according to claim 48, wherein each said resilient support is flexible inwards when under load, such that the resilient support and the skirt flex in a substantially common orientation when under load.

53. The resilient aerodynamic skirt assembly according to claim 48, further comprising clamps adapted to be coupled to I-beams of the trailer to couple said second portions of said resilient supports to the I-beams of the trailer.

54. The resilient aerodynamic skirt assembly according to claim 48, wherein a rear end of the skirt includes a concavely curved portion.

55. A resilient aerodynamic skirt assembly adapted to be mounted on a trailer, said skirt assembly comprising:
- first and second resilient skirts comprising composite material, one for mounting proximate each longitudinal side of the trailer, each said resilient skirt being elastically deformable from an original position, such that each said skirt is configured to sustain temporary deformation as a result of encountering an object, and thereafter recover the original position and shape when unloaded;
- a plurality of resilient supports each comprised of a resilient, non-metallic one piece material, each said support having a lower portion directly connected to the respective skirt and an upper portion to be located proximate or juxtaposed to an underside of the trailer, wherein each said support bends from an original position when an adjacent part of the respective skirt is deflected when encountering an object, and thereafter regains the original position when unloaded; and
- a plurality of clamps adapted to be coupled to I-beams of the trailer to secure the skirt assembly to the trailer,
- wherein said lower portion of each said resilient support contacts the respective skirt, said lower portion being substantially in a vertical plane when unloaded,
wherein each said skirt includes a rearward portion and a forward portion, the rearward portions of the skirts being generally parallel to one another when attached to the trailer and the forward portions of the skirts being configured to converge and curve towards one another when attached to the trailer, wherein an air passage located under the trailer is provided between the pair of resilient skirts, and
- wherein each said resilient support is flexible inwards when under load to allow temporary deflection of a bottom portion of the skirt, such that the resilient support and the skirt flex in a substantially common orientation when under load.

56. The resilient aerodynamic skirt assembly according to claim 55, wherein each skirt includes a lower portion to which the lower portion of each flexible support is fastened.

57. The resilient aerodynamic skirt assembly according to claim 56, wherein at least one of the resilient supports is configured to secure the skirt to the trailer.

* * * * *